United States Patent [19]

Romberg

[11] Patent Number: 4,462,743

[45] Date of Patent: Jul. 31, 1984

[54] APPARATUS FOR UNLOADING SILO

[75] Inventor: Harvey D. Romberg, Winneconne, Wis.

[73] Assignee: Sherwood Systems, Inc., Appleton, Wis.

[21] Appl. No.: 387,431

[22] Filed: Jun. 11, 1982

[51] Int. Cl.³ .............................................. B65G 65/24
[52] U.S. Cl. .................................... 414/306; 222/404; 222/415
[58] Field of Search ................ 222/404, 415; 414/305, 414/306, 308, 309, 310, 311, 312

[56] References Cited

U.S. PATENT DOCUMENTS 3,374,906  3/1968  Zimmerman ..................... 414/308
3,528,568  9/1970  Romberg ........................... 414/306

FOREIGN PATENT DOCUMENTS 57-77127  5/1982  Japan ................................. 414/306

Primary Examiner—Joseph E. Valenza
Assistant Examiner—Stuart Millman
Attorney, Agent, or Firm—James E. Nilles

[57] ABSTRACT

Apparatus for unloading material from a silo comprises a chain drive wheel located near a discharge opening on one side of the silo, a chain idler wheel, a pair of angularly spaced apart rotatable chain guide wheels mounted on a ring which is drivable in a circular path around the silo floor, and an endless flexible cutting chain reeved around the aforesaid wheels. A drive mechanism is provided to drive the ring in the circular path and to rotate the chain drive wheel to drive the chain as the chain guide wheels move, whereby reaches of the chain sweep across the silo floor to unload the material through the discharge opening. The chain drive wheel and drive mechanism therefor are located outside the opening in the silo. The chain idler wheel is located inside the silo and within the ring. Protective devices are provided on the silo floor to prevent that reach of chain extending between the chain drive wheel and the chain idler wheel from being subjected to pressure from material thereabove in the silo.

11 Claims, 11 Drawing Figures

APPARATUS FOR UNLOADING SILO

BACKGROUND OF THE INVENTION

1. Field of Use

This invention relates generally to apparatus for unloading silos or similar structures wherein agricultural materials such as silage or grain are stored. In particular it relates to such apparatus wherein an endless rotating cutting chain sweeps across the silo floor and expels the material out through an opening in the silo.

2. Description of the Prior Art

Apparatus of the aforesaid general character is disclosed in U.S. Pat. No. 3,528,568 entitled "SILO UNLOADING DEVICE" issued Sept. 15, 1970 to Harvey D. Romberg, applicant in the present application. That patent discloses a silo or bin unloader for removing the contents of a silo through an opening adjacent the lower extremity thereof. The unloader includes an endless rotating cutting chain extending through an opening in one side of the silo, across the silo floor and through another opening in the opposite side of the silo. Means at each end of the chain and located outside the silo guide and support the chain and the means at one end yieldably tension the chain. Means are provided to drive the chain. A guide member or roller is supported for movement in a circular path within the silo and means are provided to effect such movement. The guide member is disposed between the reaches of the chain and as the rotating chain engages the moving guide member, the chain travels or sweeps across the silo floor in a variable path to loosen and cut the silage and force it out of one of the openings in the silo.

SUMMARY OF THE INVENTION

Apparatus in accordance with the invention for unloading material from a silo having a floor and having one or more unloading or discharge openings in the wall of the silo above the floor generally comprises the following elements: at least one rotatable guide member; means, including a rotatable drive ring in the silo floor, for moving said guide member in a circular path above said silo floor; a pair of rotatable chain supporting wheels, such as an idler wheel and a drive wheel, at least one of said wheels being located near an opening, said drive wheel preferably being located outside of said silo; an endless flexible cutting chain reeved around said wheels and around said guide member; and means for driving said drive wheel to effect rotation of said chain while said guide member is moving along said circular path whereby reaches of said chain sweep across said silo floor.

In accordance with one aspect of the invention, an additional or second rotatable guide member is provided and is mounted at a predetermined arcuate or angular distance from the first rotatable guide member on the drive ring (i.e. a distance of between about 60° to about 90°). This two-guide arrangement provides several advantages over the prior art. For example, fluctuation or variation in the amount of cutting chain as occurred in the prior art resulting in an excess of cutting chain that needed to be taken up and controlled by a chain take-up heretofore located outside one the openings in the silo is greatly reduced or eliminated. This, in turn, provides the benefit of a relatively constant amount of chain in operation in the silo. Furthermore, the two-guide arrangement gives the added benefit of having the cutting chain pushed or moved out closer toward the walls of the silo thereby removing more material from that area where, in fact, a greater amount of material is located in view of the characteristics of a circular area such as a silo floor. An additional benefit is reduction in the cost of construction because less chain material is needed due to reduction of the excess cutting chain that needs take-up. In addition, there is less chain-opening area to be sealed as in the case of oxygen limiting type silo structures for so-called "sealed storage". Another advantage to having two guide members on the drive ring is that regardless of the diameter of the silo, the amount of take-up of slack of the cutting chain remains the same, whether the silo is 16 feet in diameter or 30 feet in diameter or more. This is in contrast with prior art apparatus using only one guide member wherein the amount of slack cutting chain would increase with the corresponding increase in silo diameter. This results in more cost savings, since all outside drive units can be built to the same dimensions regardless of size diameter of silo. The chain take-up arm of the chain drive needs to travel the same distance so this remains a standard in the design of the outside drive assembly.

In accordance with another aspect of the invention, the idler wheel which supports the rotatable chain is located opposite the discharge or unloading opening on the inside of the silo and, more specifically, within the circular path travelled by the rotatable guide member or members. If preferred, a second opening opposite the first opening could be provided in the silo. In the prior art, the so-called boot section idler wheel is located oppposite the drive section drive wheel and is located outside the silo. By placing the boot section idler wheel on the inside of the bin or silo the following advantages are gained. For example, no second opening is needed in the silo wall at the boot section for the cutting chain to pass through, therefore the structure is stronger. Also, the expense of forming and framing such opening is eliminated. However, a discharge opening may be provided. There is no need to build a sealing structure around an extra opening in an oxygen-controlled bin or silo wall, which also results in a cost savings and permits one less place for leakage to occur. The need for two wall entry idler wheels and their supporting frame work is eliminated, resulting in another cost savings. There is no need to design, manufacture, and install sealed housing covers over and around the boot section, as would be needed if the boot section remained on the outside of the bin or silo. Thus, there is one less area for material build-up to occur and create spoilage. By locating the boot section idler wheel inside the guide ring a much cleaner overall design is created which enhances the unloader apparatus. The idler wheel is located just far enough away from the ring so the ring mounted guide members will miss it as they pass by.

In accordance with still another aspect of the invention, cutting chain protective means are provided to offer relief from overhead material pressure and to give some protection to the cutting chain from overloading by the material located in the silo above the cutting chain. The protective means extend between the chain supporting drive wheel and idler wheel to prevent a reach of chain extending between those wheels from being subjected to pressure of the material in the silo. In one form, the protective means comprises a cover located above said reach of chain. In another form, the protective means comprises a groove in said floor of said silo in which said reach of chain travels. The form of design used depends on the type of material stored in the bin or silo.

For example, free flowing material such as small grains, dry shelled corn, and saw dust require a design which is an inverted V-type cover elevated high enough off of the silo floor to allow the cutting chain to operate therebeneath thus protecting the cutting chain from material pressure overhead. This protection device can rest on the floor of the bin or silo for support because the cutting chain does not cross over the center line of the silo floor. Therefore, the protection device does not interfere with the operation of the unloader by resting on the floor at the center line of the bin or silo. Space is allowed for idler wheels to pass under at each end of the cover.

On the other hand, non-free flowing materials such as corn silage or haylage or a type of material that would have a tendency to bridge over, require a design in the form a groove or depression in the silo floor. To work with this type of material, the depression allows the cutting chain to drop below the surface of the bin or silo floor and allows the material overhead to bridge over the depression in the floor, thus removing pressure from the cutting chain. This form of pressure relief to that portion of the cutting chain located next to the center line of the bin or silo can be helpful when the bin or silo is inactive for a long period of time and overhead material has a chance to settle, and also is useful at times of filling the bin or silo. Several ways are provided to guide the chain into the depression, such as a slant type of groove, or a mechanical structure where springs or a lever type mechanism are utilized to lower the cutting chain into the groove or depression.

DESCRIPTION OF PREFERRED EMBODIMENTS

Figure 1:
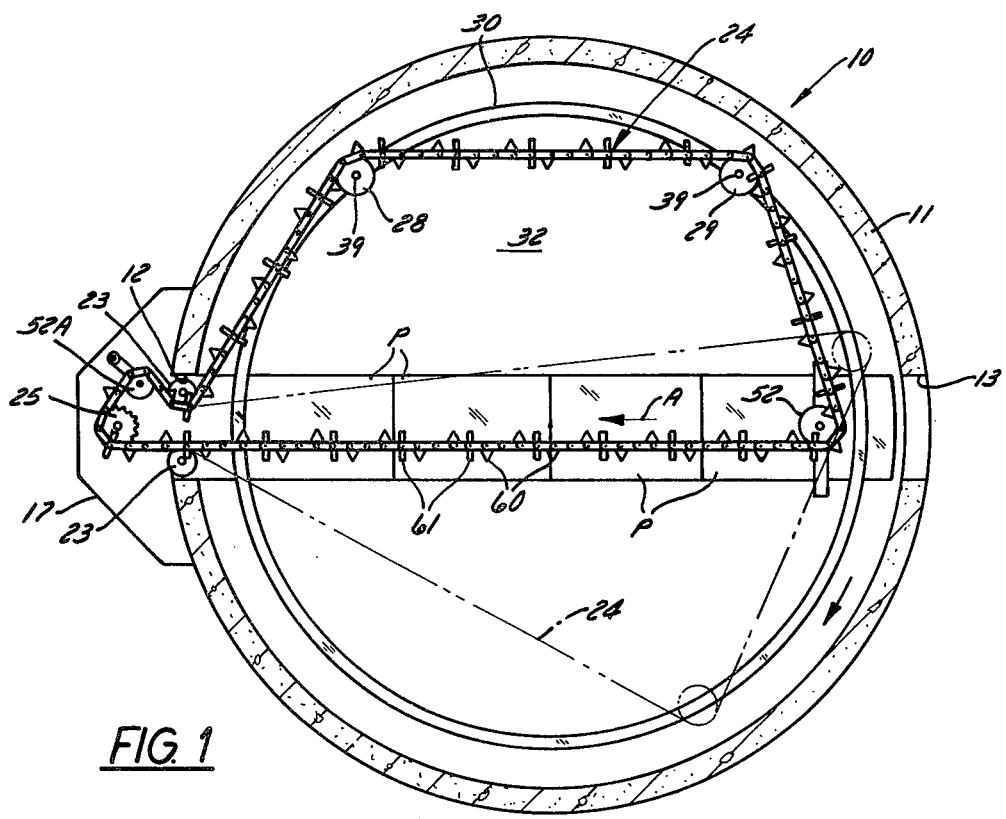
FIG. 1 is a top plan sectional view of a silo having unloading apparatus at the extreme bottom of the silo, with a portion of the cutting chain in a straight-through position.
Figure 2:
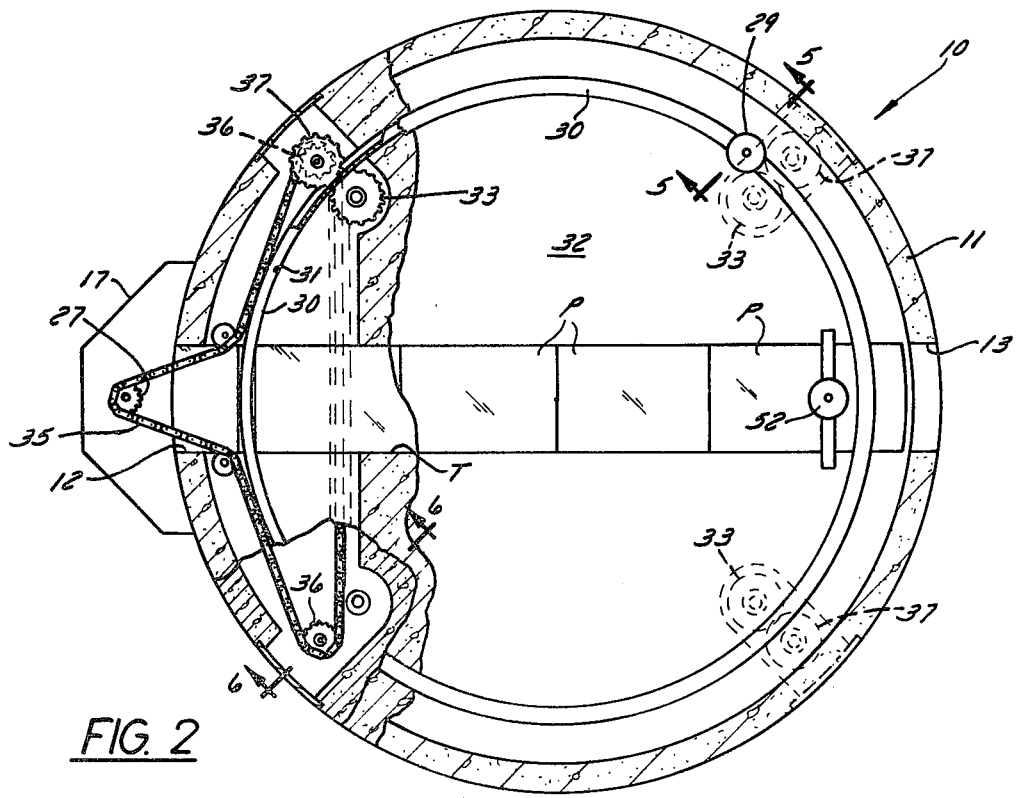
FIG. 2 is a top plan sectional view of the ring drive mechanism which is located just beneath the mechanism shown in FIG. 1.
Figure 3:
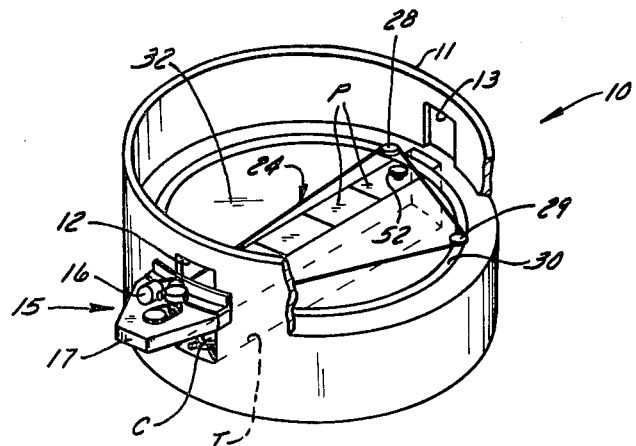
FIG. 3 is a schematic perspective view, with portions deleted, of the lower portion of the silo shown in FIGS. 1 and 2.

Referring to FIGS. 1, 2 and 3, the numeral 10 designates a silo or bin having unloading apparatus in accordance with the present invention. Silo 10 comprises a floor 32, preferably formed of concrete, and a cylindrical wall 11 formed of concrete, metal or fiberglass and having openings 12 and 13 on opposite sides just above floor 32 to enable discharge of material from the silo and, in the case of opening 12, to accommodate a cutting chain 24 hereinafter described. Opening 13 is optional and may be omitted.

Silo floor 32 is shown in FIG. 3 as being provided with a large cleanout trench T which is covered by removable metal plates P and which contains a cleanout conveyor C, but these elements form no part of the present invention.

The apparatus for unloading silo 10 generally comprises: a drive ring 30 rotatably mounted on the floor 32, a pair of guide members 28 and 29 rotatably mounted on drive ring 30 and spaced apart about 60° to 90° from each other; a drive mechanism 15 including an electric motor 16, a drive sprocket 27 driven by the motor; a drive chain 35 driven by sprocket 27 and sprockets 36 for rotating drive ring 30. The apparatus further comprises a drive sprocket 25 mounted outside of silo 10 near opening 12; an idler wheel 52 mounted on floor 32 opposite the drive sprocket 25; the endless cutting chain 24 which is reeved around drive sprocket 25, around the pair of guide members 28 and 29 and around the idler wheel 52. As FIG. 1 shows, a spring-biased take-up wheel 52A and auxiliary guides 23 are provided for chain 24 near opening 12. The drive mechanism including motor 16 drives the drive sprocket 25 while drive ring 30 is being rotatably driven, whereby cutting chain 24 travels in a path defined by the positions of the guide members 28 and 29.

Figure 4:
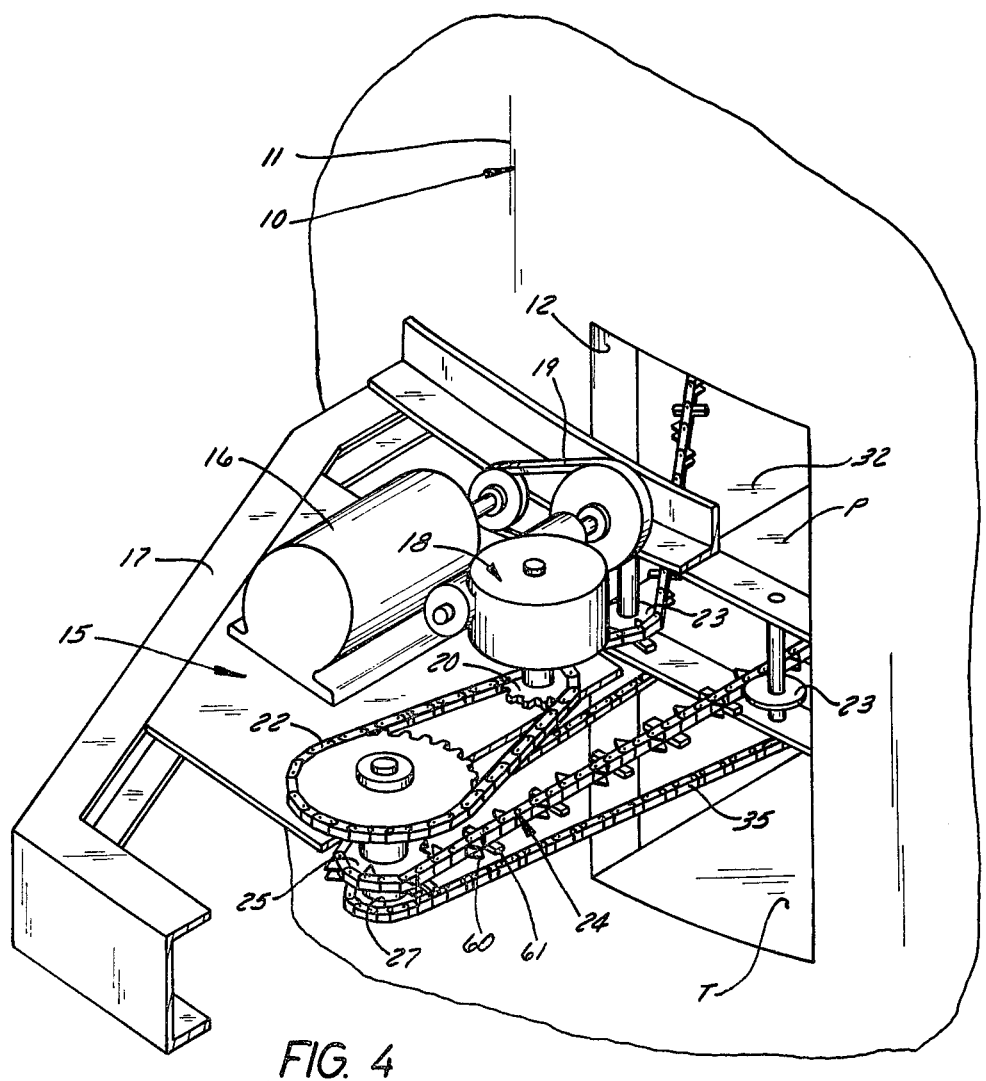
FIG. 4 is a perspective view with portions broken away of the drive mechanism for the cutting chain and the drive ring mechanism.

As FIG. 4 shows, in drive mechanism 15 the electric motor 16 is mounted on a support bracket 17 which is fixed to the silo wall 11. A V-belt pulley construction 19 becomes activated by the motor 16 and in turn a sprocket 20 on a transmission 18 connected to pulley construction 19 rotates in the same direction and, in turn, by the chain drive action of chain 22 causes simultaneous action and motion of sprocket 25, the cutting chain 24, the drive ring driving sprocket 27 and drive chain 35.

Figure 5:
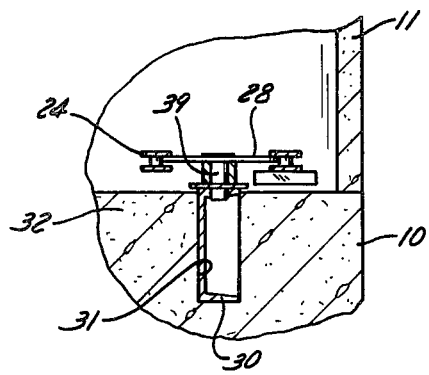
FIG. 5 is a sectional view of the drive ring, taken on the line 5—5 of FIG. 2 showing the mounting of the guide sprocket wheel.
Figure 6:
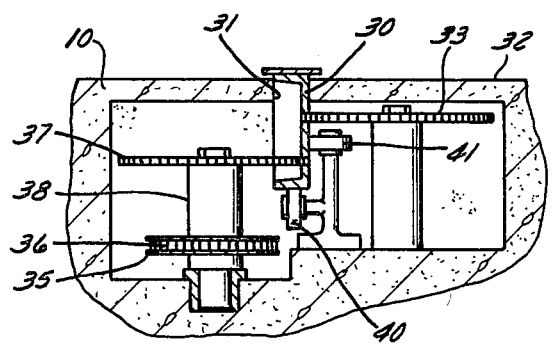
FIG. 6 is a sectional view, taken on line 6—6 of FIG. 2, showing the mounting and support for the drive ring and also the drive mechanism for moving of the ring.
Figure 7:
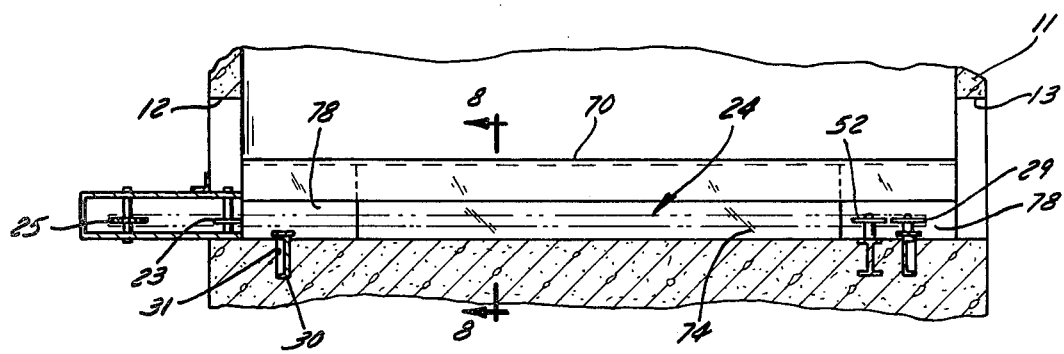
FIG. 7 is a side view, partly in section, showing one type of protective means for the cutting chain.
Figure 8:
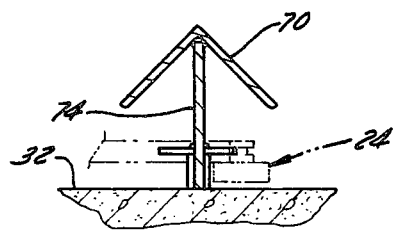
FIG. 8 is a cross-section view of the protective means taken on line 8—8 of FIG. 7.
Figure 9:
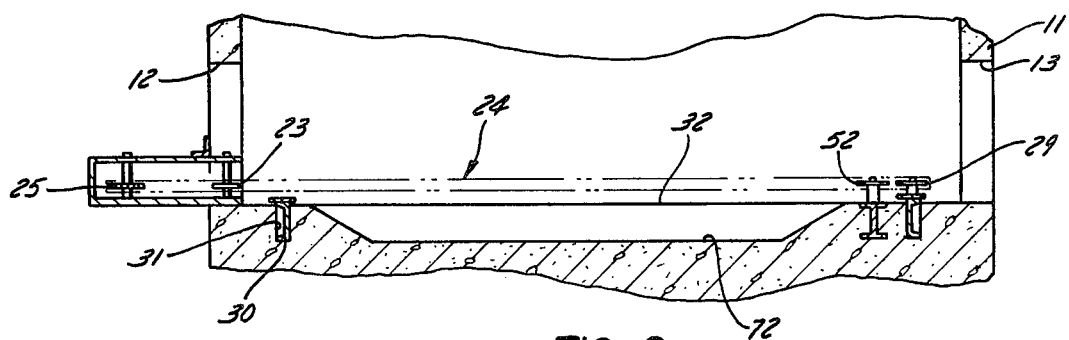
FIG. 9 is a side view, partly in section, of another type of protective means for the cutting chain.

In FIGS. 2, 5 and 6 the drive ring 30, which is a corrosion resistant metal channel, is accomodated within a continuous recessed channel 31 which is circular and formed in the floor section 32 of the silo. A series of mounting sprockets 33 are spaced at desired intervals about the circumference of the drive ring 30 to both support it and to further provide for assisting rotating the drive ring 30 in its recessed position, continuously about within its channel 31. As FIGS. 1, 2 and 4 further show the chain 35 which when driven rotates the sprockets 36 and in turn provides positive rotational drive for the drive ring 30.

As FIG. 6 shows, the rotational drive motion of sprockets 36, which are fixedly mounted on spindles 38, force the sprocket 37 which is also fixed to spindle 38 to rotate and thus drive ring 30. As FIGS. 1 and 5 make clear, the guide sprockets 28 and 29 are mounted for rotation on spindles 39 and accomodate the chain 24. The centers of rotation of the guide members 28 and 29 are spaced apart from each other by an angular or arcuate distance of 70°, as shown in FIG. 1, but could be spaced apart some other distance of between about 60° and about 90°.

For purposes of providing easy rotation of the drive ring 30 and also to prevent locking of the ring 30 in a position when stopped, a series of rollers 40 is provided to provide a vertical support at a number of places along its lower edge and also with a series of rollers 41 to properly space the drive ring 30 within its channel area 31 (see FIG. 6). If preferred, some ring supporting arrangement not employing rollers 40 could be employed.

The openings 12 and 13 are provided for silage removal; cut silage which is driven and carried by the chain 24 thus is removed from the silo through these openings. The mechanism 15 is intended to be covered by an air tight metal or fiberglass cover which may be of any appropriate design. This is not shown in the drawing.

The endless flexible cutting chain 24 is reeved around the pair of rotatable chain supporting wheels, including drive wheel or sprocket 25 and idler wheel 52, and around the afore-described guide members 28 and 29. Drive wheel 25 is located near silo opening 12 and is situated outside of the silo 10. Idler wheel 52 is located opposite silo opening 12 and is situated inside of the silo 10 and, in particular, inside ring 30, as FIG. 1 shows.

Various auxiliary sprockets and guides 23 provide a defined space and limited location for the movement of the chain 24 during the operation of the invention. The two series of mounting sprockets 33 closest to the drive mechanism 15 are of course the only series necessary for driving and thus are the only ones to need the additional chain drive sprocket 36, since the others serve the described purpose of mounting the drive ring 30 without being a part of the positive driving mechanism.

The operator of this device, requiring a predetermined amount of silage for feeding cattle, has merely to open the trap door and then set the motor of prime mover 16 in action and operation then provides for continuous rotation of the chain 24 within the silo and the continuous rotation of the ring 30 and the guide sprockets 28 and 29 thereon about the interior of the silo within its channel 31. Operation of this device permits cutting a continuous thin slice from the bottom portion of the silage within the silo, thus providing for removal of the first silage placed within the silo continously.

The type of chain 24 used may vary with the particular needs and usually has a series of cutters 60 and also a series of drag bars or removal bars 61.

It is to be noted that whenever both guide members 28 and 29 are positioned on the same side of a line extending between the drive sprocket 25 and idler wheel 52 that reach of the chain between the sprockets 25 and 52 extends in a straight line. This permits easily repairing the chain or other parts of the device. It is further contemplated that a series of removable air-tight panels (not shown) can be spaced about the circumference of the silo in positions to permit repairing of the device completely from the outside when the guide sprocket becomes immovable in a location not easily accessible to the normal openings 12 and 13.

Also it is specifically intended that a clutch arrangement could be provided to permit rotation of the cutting chain 24 while leaving the guide sprockets 28 and 29 in a set position, although the sprockets 28 and 29 are always free to rotate and guide the cutting chain 24. Likewise, the guide sprockets 28 and 29 could be made to operate and the guide ring 30 rotate while the cutting chain is either reversed or inactive.

Variations in the speed of the motor 16, and regulation of the speed of rotation of guide ring 30 in its channel 31 could provide variation in removal of silage from the silo.

As FIG. 1 shows, when motor 16 is energized and in operation, ring 30 rotates in a circular path moving the guide members 28 and 29 along the same path. Simultaneously, the cutting chain 24 is driven, for example, in the direction of Arrow A around the idler wheel 52, the drive wheel 25, the auxiliary guides 23, the take-up wheel 52A, the guide member 28 and the guide member 29. As this occurs, chain 24 continuously slices through the silage material on silo floor 32 and moves it toward and through the opening 12 and through an opening 13 if such is provided to the exterior of the silo 10.

As FIGS. 5 through 11 show, in accordance with still another aspect of the invention, cutting chain protective means are provided for cutting chain 24 to protect it from overhead pressure of material in silo 10 and to give some protection to the cutting chain from overloading by such material. The protective means extend between the chain supporting drive wheel 25 and the idler wheel 52 to prevent a reach of chain 24 extending in a straight line between those wheels from being subjected to pressure of the material in the silo. In one embodiment shown in FIGS. 7 and 8, the protective means comprises a cover 70 located above said reach of chain. In another embodiment shown in FIGS. 9 through 11, the protective means comprises grooves 72 in floor 32 of silo 10 in which said reach of chain travels. The form of design used in each embodiment depends on the type of material stored in the bin or silo 10.

As previously explained, free flowing material such as small grains, dry shelled corn, and saw dust require the inverted V-type cover 70 which is elevated high enough off of the silo floor 32 by a continuous support 74 to allow the cutting chain 24 to operate therebeneath, thus protecting the cutting chain from material pressure overhead. The support 74 can rest on the floor 32 of the silo 10 because the cutting chain 24 does not cross over the center line of the silo floor. Space, in the form of cut-outs 78 in support 74, are provided to allow for the idler wheels 28 and 29 to pass under at each end of the cover.

Non-free flowing materials such as corn silage or haylage or a type of material that would have a tendency to bridge over, require the grooves or depressions 72 in the silo floor 32. Each depression 72 allows the cutting chain 24 to drop below the surface of the silo floor 32 and allows the material overhead to bridge over the depression in the floor, thus substantially removing pressure from the cutting chain 24.

Figure 10:
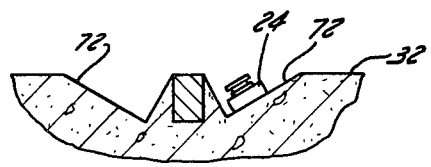
FIG. 10 is an end view of the protective means shown in FIG. 9.
Figure 11:
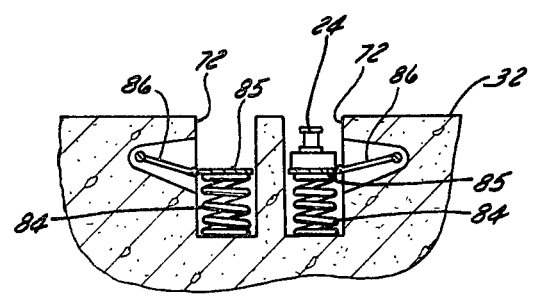
FIG. 11 is an end view of another embodiment similar to that shown in FIGS. 9 and 10.

If preferred, as FIG. 10 shows, the walls of the grooves 72 may be slanted to facilitate drag of the cutting chain through the groove area. If preferred, as FIG. 11 shows, vertically movable plates such as 85 may be provided and supported by plate springs 84 or linkages 86 to allow or enable the cutting chain 24 to be raised or lowered to free it up and prevent binding in the groove. The linkages 86 could be employed to accomplish such vertical movement of the plates 85 to raise and lower the cutting chain 24 relative to the groove or depression 72.

I claim:

1. Apparatus for unloading material from a silo having a floor and an opening in the wall of said silo above said floor, said apparatus comprising:
   a pair of rotatable guide members;
   means for moving said guide members in a circular path above said silo floor, said guide members being spaced apart a predetermined angular distance on said circular path;
   a pair of rotatable chain supporting wheels, one of said wheels being located in a fixed position near said opening, and the other of said wheels being located in a fixed position within said circular path;
   an endless flexible cutting chain reeved around said wheels and around said guide members and being temporarily disengageable from said other wheel;
   and means for driving said chain while said guide members are moving along said circular path whereby reaches of said chain sweep across said silo floor without crossing a line extending between said pair of wheels.

2. Apparatus according to claim 1 wherein said predetermined angular distance is between about 60° and 90°.

3. Apparatus according to claim 1 or 2 wherein one of said chain supporting wheels is an idler wheel.

4. Apparatus according to claim 1 or 2 wherein one of said chain supporting wheels is an idler wheel and wherein the other of said chain supporting wheels is a drive wheel and wherein said means for driving said chain is connected to drive said drive wheel.

5. Apparatus according to claim 4 wherein said drive wheel is located outside of said silo.

6. Apparatus for unloading material from a silo having a floor and an opening in the wall of said silo above said floor, said apparatus comprising:
   a pair of rotatable guide members;
   means for moving said guide members in a circular path above said silo floor, said guide members being spaced apart a predetermined angular distance on said circular path;
   a pair of rotatable chain supporting wheels, one of said wheels being located in a fixed position near said opening;
   the other of said wheels being located in a fixed position opposite said one wheel;
   an endless flexible cutting chain reeved around said wheels and around said guide member and being temporarily disengageable from said other wheel;
   means for driving said chain while said guide member is moving along said circular path whereby reaches of said chain sweep across said silo floor without crossing a line extending between said pair of wheels;
   and stationary protective means extending between said chain supporting wheels to prevent a reach of chain extending between said wheels from being subjected to pressure of said material in said silo.

7. Apparatus according to claim 6 wherein said protective means comprises a cover located above said reach of chain.

8. Apparatus according to claim 6 wherein said protective means comprises a groove in said floor of said silo in which said reach of chain travels.

9. Apparatus according to claim 6 or 7 or 8 wherein said one of said chain supporting wheels is an idler wheel.

10. Apparatus according to claim 6 or 7 or 8 wherein said one of said chain supporting wheels is an idler wheel and wherein the other of said chain supporting wheels is a drive wheel and wherein said means for driving said chain is connected to drive said drive wheel.

11. Apparatus according to claim 10 wherein said drive wheel is located outside of said silo.

* * * * *